US011390761B2

(12) United States Patent
Ferrari et al.

(10) Patent No.: US 11,390,761 B2
(45) Date of Patent: Jul. 19, 2022

(54) ELASTOMERIC COATINGS

(71) Applicants: ARLANXEO SINGAPORE PTE. LTD., Singapore (SG); University of Western Ontario, London (CA)

(72) Inventors: Lorenzo Ferrari; Dana K. Adkinson, London (CA); Jun Yang, London (CA); Binyu Yu, Montreal (CA); Maxim Paliy, London (CA); Brad Kobe, London (CA)

(73) Assignee: University of Western Ohio, London (CA)

( * ) Notice: Subject to any disclaimer, the term of this patent is extended or adjusted under 35 U.S.C. 154(b) by 0 days.

(21) Appl. No.: 17/031,431

(22) Filed: Sep. 24, 2020

(65) Prior Publication Data

US 2021/0017403 A1  Jan. 21, 2021

Related U.S. Application Data

(63) Continuation of application No. 16/061,108, filed as application No. PCT/CA2016/051445 on Dec. 9, 2016, now abandoned.

(30) Foreign Application Priority Data

Dec. 11, 2015 (EP) .................................... 15199556

(51) Int. Cl.
*H01B 1/24* (2006.01)
*C09D 7/40* (2018.01)
(Continued)

(52) U.S. Cl.
CPC .............. *C09D 5/24* (2013.01); *B05D 1/12* (2013.01); *B05D 5/00* (2013.01); *C09D 5/1681* (2013.01);
(Continued)

(58) Field of Classification Search
CPC ....... H01B 1/24; C08K 2201/016; C09D 7/70
See application file for complete search history.

(56) References Cited

U.S. PATENT DOCUMENTS

| 2006/0214560 A1* | 9/2006 | Noguchi | H01J 61/0675 |
| | | | 427/112 |
| 2010/0078194 A1 | 4/2010 | Bhatt et al. | |

(Continued)

FOREIGN PATENT DOCUMENTS

| CA | 2418884 C | 8/2004 |
| CN | 102140218 | 8/2011 |

(Continued)

OTHER PUBLICATIONS

Kang et al., "Preparation and properties of ethylene propylene diene rubber/multi walled carbon nanotube composites for strain sensitive materials"; Applied Science and Manufacturing, (2011) vol. 42, Nr: 6, pp. 623-630.

(Continued)

*Primary Examiner* — Khanh T Nguyen
(74) *Attorney, Agent, or Firm* — The Dobrusin Law Firm, P.C.; Terry M. Finerman

(57) ABSTRACT

A polymer nanocomposite coating of an elastomeric film containing at least 30 wt % conductive nanoparticles based on combined weight of elastomer and conductive nanoparticles is provided. The conductive nanoparticles have an average particle size along each dimension of less than 500 nm for nanoparticles having an aspect ratio of less than 20:1 or have an average particle size along each dimension of less than 2000 nm for nanoparticles having an aspect ratio of 20:1 or greater. The conductive nanoparticles are formed into hierarchical micro- and nano-sized aggregates having re-entrant morphology. The coating is both superoleophobic and conductive and retains these properties even when (Continued)

stretched under strain to over 100%. The coatings may be produced with simple spray technology.

20 Claims, 12 Drawing Sheets

(51) Int. Cl.
| | |
|---|---|
| C09D 5/24 | (2006.01) |
| C09D 5/16 | (2006.01) |
| C09D 7/61 | (2018.01) |
| B05D 1/12 | (2006.01) |
| B05D 5/00 | (2006.01) |
| C09D 109/00 | (2006.01) |
| C09D 147/00 | (2006.01) |
| C09D 183/04 | (2006.01) |
| H01B 3/44 | (2006.01) |
| H01B 3/46 | (2006.01) |
| C08K 3/04 | (2006.01) |

(52) U.S. Cl.
CPC .............. C09D 7/61 (2018.01); C09D 7/67 (2018.01); C09D 7/68 (2018.01); C09D 7/69 (2018.01); C09D 7/70 (2018.01); C09D 109/00 (2013.01); C09D 147/00 (2013.01); C09D 183/04 (2013.01); H01B 1/24 (2013.01); H01B 3/441 (2013.01); H01B 3/46 (2013.01); C08K 3/04 (2013.01); C08K 3/041 (2017.05); C08K 2201/001 (2013.01); C08K 2201/005 (2013.01); C08K 2201/011 (2013.01); C08K 2201/016 (2013.01)

(56) References Cited

U.S. PATENT DOCUMENTS

| | | |
|---|---|---|
| 2010/0086787 A1 | 4/2010 | Qi et al. |
| 2010/0234514 A1* | 9/2010 | Noguchi ............ C08K 7/24 524/496 |
| 2011/0256454 A1 | 10/2011 | Nicolas |
| 2012/0261182 A1 | 10/2012 | Dis et al. |
| 2015/0153642 A1 | 6/2015 | Yang et al. |
| 2015/0194240 A1 | 7/2015 | Ranganathan et al. |
| 2018/0166689 A1 | 6/2018 | Nicolas et al. |

FOREIGN PATENT DOCUMENTS

| | | |
|---|---|---|
| CN | 104212346 B | 12/2014 |
| KR | 20120034370 A | 4/2012 |
| WO | 2010017558 A2 | 1/2010 |
| WO | 2011089083 A1 | 7/2011 |
| WO | 2012087352 A2 | 6/2012 |
| WO | 2013188958 A1 | 12/2013 |

OTHER PUBLICATIONS

Sun Zhihong, et al., "Expanding the biotechnology potential of lactobacilli through comparative genomics of 213 strains and associated genera", Nature Communications, (2015) Source info: vol. 6.
Bokobza L, "Multiwall carbon nanotube-filled natural rubber: Electrical and mechanical properties", eXPRESS Polymer Letters, (2012) vol. 6, Nr: 3, pp. 213-223.
Srinivasan et al., "Solution spraying of poly(methyl methacrylate) blends to fabricate microtextured, superoleophobic surfaces", Polymer, (2011), vol. 52, No. 14, pp. 3209-3218.
Maurice Morton, Rubber Technology, Kluwer Academic Publishers, (1987) pp. 297-300.
Tuteja et al., Designing Superoleophobic Surfaces; www.sciencemag.org, vol. 318, Dec. 7, 2007, pp. 1618-1622.
Tuteja et al., "Robust omniphobic surfaces", www.pnas.org/cgi/dio/10.1073/pnas0804872105, pp. 18200-18205, vol. 105, No. 47, Nov. 25, 2008.
Arindam Das et al., "Superoleophobic and conductive carbon nanofiber/fluoropolymer composite films" Carbon, Elsevier Oxford, GB; vol. 50, No. 3, pp. 1346-1354, 2012.
Steele et al., "Inherently superoleophobic nanocomposite coatings by spray atomization", Nano Letters, American Chemical Society, vol. 9, No. 1, p. 501-505, 2009 (published online, Dec. 2008)(DOI: 10.1021/nl8037272).
Paliy et al., "Nonmonotonic piezoresistive effect in elastomeric composite films" Publication data: Journal of Applied Polymer Science, Wiley Periodicals, Inc.; vol. 133,No. 23, pp. 1-11, 2016 (DOI: 10.1002/APP.43518).
Mates et al, "Extremely stretchable and conductive water-repellent coatings for low-cost ultra-flexible electronics", Nature Communications, Macmillan Publishers Limited, Nov. 2015 (DOI: 10.1038/ncomms9874).
Japanese Office Action, JP Application No. 2018-549375 dated Sep. 28, 2020.
First Chinese Office Action, CN Application No. 201680077907.5 dated Feb. 9, 2021.
Second Chinese Office Action, CN Application No. 201680077907.5 dated Oct. 29, 2021.

* cited by examiner

ELASTOMERIC COATINGS

FIELD OF THE INVENTION

The present invention relates to coatings and processes for forming coatings on substrates. In particular, the present invention relates to dual-function super-oil-repellent and conductive elastomeric coatings and processes therefor.

BACKGROUND OF THE INVENTION

In the past few decades, the control of surface wetting has been studied extensively due to its scientific significance and the potential applications in a variety of areas, including self-cleaning and anticorrosion coatings. Measuring the apparent contact angle (CA) is the most straightforward way to characterize wetting of surfaces. A surface is called superhydrophobic, if both the advancing and receding contact angles for a liquid droplet (e.g. water) exceed a value of about 150°. Consequently, such a surface is also characterized by a low (<5°-20°) contact angle hysteresis (CAH). This definition is not rigorous, but it encompasses a common qualitative feature that liquid droplets do not stick to superhydrophobic surfaces and easily roll off when the surface is tilted. The surface wettability is affected both by the chemical nature of the surface and by its roughness. There exist a large number of known superhydrophobic surfaces, both in nature (such as the lotus leaf) and artificial structures, but superoleophobic surfaces (CA for oils such as hexadecane is greater than 150°) are still rare.

A multitude of experimental strategies have been developed to produce superhydrophobic and/or superoleophobic surfaces. All these strategies involve modifications of both the surface energy and surface roughness. An effective way to lower the surface energy is to add fluorinated moieties to the surface by chemical or physical methods. However, simply fluorinating a surface will produce neither superhydrophobic nor superoleophobic coatings. Thus, most of research effort has been focused on creating intricate surface morphologies that have re-entrant or overhanging features, and multi-scale hierarchical structures. For example, superoleophobic surfaces which exhibit a contact angle greater than 150° have been prepared by various techniques including electrochemical processes, lithography and sol-gel. However, most of these techniques are expensive and complex, involving many fabrication steps, and are therefore difficult to scale up to coat a large surface area.

Superoleophobic coatings may be formed by spray casting nanoparticle-polymer suspensions (Steele, A; Bayer, I; Loth, E. "Inherently superoleophobic nanocomposite coatings by spray atomization", *Nano Letters*, 9(1), 2009, pp. 501-505). "The method involves the use of ZnO nanoparticles blended with a waterborne perfluoroacrylic polymer emulsion using co-solvents. Acetone is shown to be an effective compatibilizing co-solvent to produce self-assembling nanocomposite slurries that form hierarchical nanotextured morphology upon curing. The coatings can be applied to large and/or flexible substrates by spray coating and require no additional surface treatments of commonly used hydrophobic molecules such as fluorosilanes."

Superoleophobic surfaces may also be prepared in a single step by spraying polymethyl methacrylate (PMMA) and fluorodecyl POSS blends using a hydrochlorofluorocarbon solvent with an air brush with a pressurized nitrogen stream (Srinivasan, S; Chatre; S S; Mabry, J M; Cohen, R E; McKinley, G H. "Solution spraying of poly(methyl methacrylate) blends to fabricate microtextured, superoleophobic surfaces", *Polymer,* 52(14), 2011, pp. 3209-3218). "Scanning electron micrographs show the formation of microtextured surfaces possessing re-entrant curvature; a critical feature for obtaining liquid repellency with low surface tension liquids. The surface morphology can be tuned systematically from a corpuscular or spherical, microstructure to a beads-on-string structure and finally to bundled fibers by controlling the solution concentration and molecular weight of the sprayed polymer. However, according to the ASTM-3359 standard for adhesion testing, the coating showed poor adhesion."

A solution-based, large-area coating procedure is also known (Das, A; Schutzius, T M; Bayer, I S; Megaridis, C M. "Superoleophobic and conductive carbon nanofiberlfluoropolymer composite films", *Carbon,* 50, 2012, pp. 1346-1354). This procedure "produces conductive polymer composite films consisting of hollow-core carbon nanofibers (CNFs) and a fluoroacrylic co-polymer available as a water-based dispersion. CNFs (100 nm diameter, length about 130 µm) are dispersed by sonication in a formic acid/acetone co-solvent system, which enable colloidal stability and direct blending of the CNFs and aqueous fluoroacrylic dispersions in the absence of surfactants. The dispersions are sprayed on smooth and microtextured surfaces, thus forming conformal coatings after drying. Nanostructured composite films of different degrees of oil and water repellency were fabricated by varying the concentration of CNFs. Water and oil static contact angles (CAs) ranged from 98° to 164° and from 61° to 164°, respectively. Some of the coatings with the highest water/oil CAs displayed self-cleaning behavior (droplet roll-off angles <10°). Inherent conductivity of the composite films ranged from 63 to 940 S/m at CNF concentrations from 10 to 60 wt %, respectively. Replacement of the long CNFs with shorter solid-core carbon nanowhiskers (150 nm diameter, length 6-8 µm) produced stable fluoropolymer-nanowhisker dispersions, which were inkjetted to generate hydrophobic, conductive, printed line patterns with a feature size of about 100 µm."

Conducting polymer nanocomposite coatings have become increasingly important because of their broad applications in electromagnetic interface shielding, electrostatic discharge, electrostatic painting, OLED (organic light-emitting diode), sensors and actuators, and organic or hybrid solar cells. Electrically conductive polymer nanocomposites are specially designed combinations of one or more conductive nanomaterials with a polymer resin, usually prepared by blending or mixing. Such conductive polymer nanocomposites can be applied to a substrate of choice to form a thin film or coating for electron transport or current conduction. However, challenges still remain in adhesion of the conductive polymer nanocomposite coatings to the substrates.

Despite advances made in the art of superoleophobic coatings, especially conductive superoleophobic coatings, issues of coating stretchability and stability remain to be addressed. There is a need to prepare more robust coatings having a superoleophobic characteristic alone or in combination with other functionality and having good adhesion to substrates. Specifically, there remains a need for less expensive materials and easier methods for preparing functional coatings having superoleophobic and conductive characteristics.

SUMMARY OF THE INVENTION

There is provided a polymer nanocomposite coating comprising an elastomeric film containing at least 30 wt % conductive nanoparticles based on combined weight of elastomer and conductive nanoparticles, the conductive nanoparticles having an average particle size along each dimension of less than 500 nm for nanoparticles having an aspect ratio of less than 20:1 or having an average particle size along each dimension of less than 2000 nm for nanoparticles having an aspect ratio of 20:1 or greater, the conductive nanoparticles formed into micro- and nano-sized aggregates having re-entrant morphology.

There is further provided a process for producing a polymer nanocomposite coating, comprising spraying a blend of an elastomer and conductive nanoparticles on to a substrate to form a film on the substrate, the blend comprising at least 30 wt % of the conductive nanoparticles based on combined weight of elastomer and conductive nanoparticles, the conductive nanoparticles having an average particle size along each dimension of less than 2000 nm, the conductive nanoparticles forming micro- and nano-sized aggregates on the substrate, the aggregates having re-entrant morphology.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
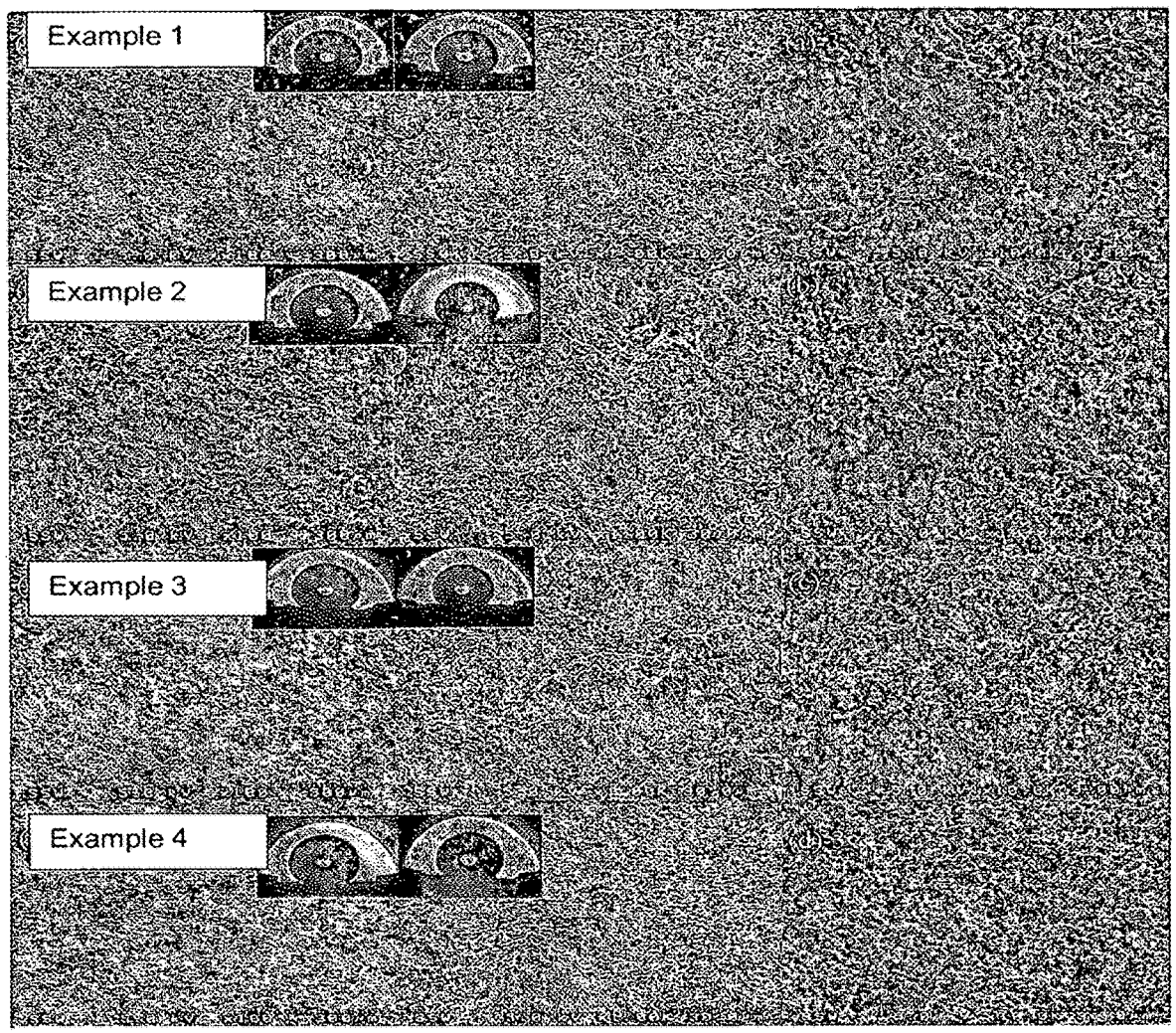
FIG. 1 depicts different magnification SEM images showing surface morphology of UV cross-linked coatings with a solute concentration of 12.5 mg/mL, where the solutes are (a) 50/50 wt % PIP/CB blends, (b) 45/55 wt % PIP/CB blends, (c) 40/60 wt % PIP/CB blends, and (d) 34/66 wt % PIP/CB blends.

Elastomers are polymers with viscoelasticity, generally having low Young's modulus and high yield strain compared with other materials. As such, elastomers are generally able to stretch to a greater extent than other polymers. Some examples of suitable elastomers are polyolefin-based elastomers, polydimethylsiloxanes (PDMS) and mixtures thereof. Polyolefin-based elastomers are particularly preferred, for example polyisobutene (PIB), polyisoprene (PIP) and poly(isobutene-co-isoprene) (butyl rubber, IIR) functionalized derivatives thereof and mixtures thereof. Some examples of butyl rubber elastomers include butyl rubber (IIR), bromobutyl rubber (BIIR), chlorobutyl rubber (CIIR), and mixtures thereof. Some examples of particular non-butyl rubber elastomers include isobutylene-methylstyrene (BIMS) rubber (commercially available under the trade name Exxpro™), ethylene propylene rubber (EPR), ethylene propylene diene monomer (EPDM) rubber, butadiene rubber (BR), solution styrene butadiene rubber (sSBR), emulsion styrene butadiene rubber (eSBR), acrylonitrile butadiene rubber (NBR), hydrogenated acrylonitrile butadiene rubber (HNBR), natural rubber (NR), epoxidized natural rubber (ENR), polyurethane (PU), polyisoprene rubber, polyacrylic or polyacrylate (ACM), chloroprene (CR), chlorosulphonylpolyethylene or chlorosulphonatedpolyethylene (CSM), ethylene acrylic (AEM), thermoplastic polyester urethane (AU), thermoplastic polyether urethane (EU), epichlorohydrin (ECO), fluoroethylene propylene-perfluoroalkoxy (FEP or PFA), tetrafluoroethylene/propylene (FEPM or TFE/P), perfluoroelastomer (FFKM/FFPM), fluoroelastomer or fluorocarbon (FKM/FPM), fluorosilicone (FVMQ), silicone (VMQ/PVMQ), polytetrafluoroethylene (PTFE), ethylene vinylacetate (EVA) rubber, ethylene acrylate rubber, polyurethane rubber, polyisobutylene (PIB), chlorinated polyethylene (CPE), polynorbornene rubber (PNB), polysulphide rubber (TR) and mixtures thereof. Functionalized derivatives of elastomers include elastomers that comprise functional groups bound thereto. Functional groups include, for example, anhydride groups, carboxyl groups, hydroxyl groups, epoxy groups, polyethylene oxide groups, halo (e.g. chloro or bromo) groups, isocyanate groups, other polar groups or mixtures thereof.

A butyl rubber elastomer as described herein is a copolymer derived from at least one isoolefin monomer and at least one multiolefin monomer, and optionally one or more further copolymerizable monomers, such as a styrene monomer.

Suitable isoolefin monomers include hydrocarbon monomers having 4 to 16 carbon atoms. In one embodiment, isoolefins have from 4-7 carbon atoms. Examples of suitable isoolefins include isobutene (isobutylene), 2-methyl-1-butene, 3-methyl-1-butene, 2-methyl-2-butene, 4-methyl-1-pentene, 4-methyl-1-pentene and mixtures thereof. A preferred isoolefin monomer is isobutene (isobutylene).

Multiolefin monomers copolymerizable with the isoolefin monomers may include dienes, for example conjugated dienes. Particular examples of multiolefin monomers include those having in the range of from 4-14 carbon atoms. Examples of suitable multiolefin monomers include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof. A particularly preferred conjugated diene is isoprene. β-pinene may also be used instead of or in addition to the multiolefin monomer. Herein multiolefin/β-pinene monomers refers to the presence or use of one or more multiolefin monomers and/or β-pinene monomer.

The butyl rubber polymer may optionally include one or more additional copolymerizable monomers along with the isoolefin and multiolefin/β-pinene monomers. Additional copolymerizable monomers include monomers copolymerizable with the isoolefin and/or multiolefin/β-pinene monomers. Suitable copolymerizable monomers include, for example, styrenic monomers, such as alkyl-substituted vinyl aromatic co-monomers, including but not limited to a $C_1$-$C_4$ alkyl substituted styrene. Specific examples of copolymerizable monomers include, for example, α-methyl styrene, p-methyl styrene, chlorostyrene, cyclopentadiene and methylcyclopentadiene. In one embodiment, the butyl rubber polymer may comprise random copolymers of isobutylene, isoprene and p-methyl stryene.

The butyl rubber polymers are formed from a mixture of monomers described herein. In one embodiment, the monomer mixture comprises from about 80% to about 99% by weight of an isoolefin monomer and from about 1% to 20% by weight of a multiolefin/β-pinene monomer. In another embodiment, the monomer mixture comprises from about 85% to about 99% by weight of an isoolefin monomer and from about 1% to 15% by weight of a multiolefin/β-pinene monomer. In certain embodiments, three monomers may be employed. In these embodiments, the monomer mixture may comprise about 80% to about 99% by weight of isoolefin monomer, from about 0.5% to about 5% by weight of a multiolefin/β-pinene monomer, and from about 0.5% to about 15% by weight a third monomer copolymerizable with the isoolefin and/or multiolefin/β-pinene monomers. In one embodiment, the monomer mixture comprises from about 68% to about 99% by weight of an isoolefin monomer, from about 0.5% to about 7% by weight of a multiolefin/β-pinene monomer and from about 0.5% to about 25% by weight of a third monomer copolymerizable with the isoolefin and/or multiolefin/β-pinene monomers.

The butyl rubber polymer may be prepared by any suitable method, of which several are known in the art. For example, the polymerization of monomers may be performed in the presence of $AlCl_3$ and a proton source and/or cationogen capable of initiating the polymerization process. A proton source includes any compound that will produce a proton when added to $AlCl_3$ or a composition containing $AlCl_3$. Protons may be generated from the reaction of $AlCl_3$ with proton sources such as water, alcohol or phenol to produce the proton and the corresponding by-product. Such reaction may be preferred in the event that the reaction of the proton source is faster with the protonated additive as compared with its reaction with the monomers. Other proton generating reactants include thiols, carboxylic acids, and the like. The most preferred proton source is water. The preferred ratio of $AlCl_3$ to water is between 5:1 to 100:1 by weight. It may be advantageous to further introduce $AlCl_3$ derivable catalyst systems, diethylaluminium chloride, ethylaluminium chloride, titanium tetrachloride, stannous tetrachloride, boron trifluoride, boron trichloride, or methylalumoxane. Inert solvents or diluents known to the person skilled in the art for butyl polymerization may be considered as the solvents or diluents (reaction medium). These include alkanes, chloroalkanes, cycloalkanes or aromatics, which are frequently also mono- or polysubstituted with halogens. Hexane/chloroalkane mixtures, methyl chloride, dichloromethane or the mixtures thereof may be preferred. Chloroalkanes are preferably used. The monomers are generally polymerized cationically, preferably at temperatures in the range from −120° C. to +20° C., preferably in the range from −100° C. to −20° C., and pressures in the range from 0.1 to 4 bar.

The butyl polymer may also be produced via a solution process as outlined in WO2011089083 A1 and references therein. A C6 solvent is a particularly preferred choice for use in a solution process. C6 solvents suitable for use in the present invention preferably have a boiling point of between 50° C. and 69° C. Examples of preferred C6 solvents include n-hexane or hexane isomers, such as 2-methyl pentane or 3-methyl pentane, or mixtures of n-hexane and such isomers as well as cyclohexane.

The butyl rubber polymer may comprise at least 0.5 mol % repeating units derived from the multiolefin/β-pinene monomers. In some embodiments, the repeating units derived from the multiolefin/β-pinene monomers may be present in the butyl rubber polymer in an amount of at least 0.75 mol %, or at least 1.0 mol %, or at least 1.5 mol %, or at least 2.0 mol %, or at least 2.5 mol %, or at least 3.0 mol %, or at least 3.5 mol %, or at least 4.0 mol %, or at least 5.0 mol %, or at least 6.0 mol %, or at least 7.0 mol %. In one embodiment, the butyl rubber polymer may comprise from 0.5 to 2.2 mol % of the multiolefin/β-pinene monomers. In another embodiment, the butyl rubber polymer may comprise higher multiolefin/β-pinene monomer content, e.g. 3.0 mol % or greater. The preparation of suitable high multiolefin/β-pinene butyl rubber polymers is described in Canadian Patent Application 2,418,884, which is incorporated herein by reference.

In one embodiment, the halogenated butyl rubber polymer may be obtained by first preparing a butyl rubber polymer from a monomer mixture comprising one or more isoolefins, and one or more multiolefins and/or β-pinene, followed by subjecting the resulting copolymer to a halogenation process to form the halogenated butyl rubber polymer. Halogenation can be performed according to the process known by those skilled in the art, for example, the procedures described in Rubber Technology, 3rd Ed., Edited by Maurice Morton, Kluwer Academic Publishers, pp. 297-300 and further documents cited therein. Halogenation may involve bromination and/or chlorination. Brominated butyl rubber polymers may be of particular note. For example, a brominated butyl rubber comprising isobutylene and less than 2.2 mole percent isoprene is commercially available from LANXESS Deutschland GmbH and sold under the name BB2030™.

The halogenated butyl rubber thus obtained may then be cured. The choice of curing system suitable for use is not particularly restricted and is within the purview of a person skilled in the art. In certain embodiments, the curing system may be sulphur-based, peroxide-based, resin-based or ultraviolet (UV) light-based.

A sulfur-based curing system may comprise: (i) a metal oxide, (ii) elemental sulfur and (iii) at least one sulfur-based accelerator. The use of metal oxides as a component in the sulphur curing system is well known in the art. A suitable metal oxide is zinc oxide, which may be used in the amount of from about 1 to about 10 phr. In another embodiment, the zinc oxide may be used in an amount of from about 2 to about 5 phr. Elemental sulfur, (component (ii)), is typically used in amounts of from about 0.2 to about 2 phr. Suitable sulfur-based accelerators (component (iii)) may be used in amounts of from about 0.5 to about 3 phr. Non-limiting examples of useful sulfur-based accelerators include thiuram sulfides (e.g. tetramethyl thiuram disulfide (TMTD)), thiocarbamates (e.g. zinc dimethyl dithiocarbamate (ZDC)) and thiazyl or benzothiazyl compounds (e.g. mercaptobenzothiazyl disulfide (MBTS)). A sulphur based accelerator of particular note is mercaptobenzothiazyl disulfide.

Peroxide based curing systems may also be suitable, especially for butyl rubber ionomers comprising residual multiolefin content in excess of about 0.2 mol %. A peroxide-based curing system may comprises a peroxide curing agent, for example, dicumyl peroxide, di-tert-butyl peroxide, benzoyl peroxide, 2,2'-bis(tert.-butylperoxy diisopropylbenzene (Vulcup® 40KE), benzoyl peroxide, 2,5-dimethyl-2,5-di(tert-butylperoxy)-hexyne-3, 2,5-dimethyl-2,5-di(benzoylperoxy)hexane, (2,5-bis(tert-butylperoxy)-2,5-dimethyl hexane and the like. One such peroxide curing agent comprises dicumyl peroxide and is commercially available under the name DiCup 40C. Peroxide curing agents may be used in an amount of about 0.2-7 phr, or about 1-6 phr, or about 4 phr. Peroxide curing co-agents may also be used. Suitable peroxide curing co-agents include, for example, triallyl isocyanurate (TAIC) commercially available under the name DIAK 7 from DuPont, N,N'-m-phenylene dimaleimide known as HVA-2 from DuPont or Dow), triallyl cyanurate (TAC) or liquid polybutadiene known as Ricon D 153 (supplied by Ricon Resins). Peroxide curing co-agents may be used in amounts equivalent to those of the peroxide curing agent, or less. The state of peroxide cured articles is enhanced with butyl polymers containing increased levels of unsaturation, for example a multiolefin content of at least 0.5 mol %.

The blend may be cured by resin cure system and, if required, an accelerator to activate the resin cure. Suitable resins include but are not limited to phenolic resins, alkylphenolic resins, alkylated phenols, halogenated alkyl phenolic resins and mixtures thereof.

In some cases, curing may be achieved by heating the blend at a suitable curing temperature in the presence of the curing system. The curing temperature may be about 80° C. to about 250° C., or 100° C. to about 200° C., or about 120° C. to about 180° C.

Conductive nanoparticles are generally known in the art and include, for example, conductive carbon black (CB), carbon nanotubes (CNTs) (e.g. multi-walled carbon nanotubes (MWCNTs)) and mixtures thereof. Conductive carbon black is particularly preferred.

Carbon black is widely available, is mass produced and is low in cost. Carbon black is a form of amorphous carbon that has a high surface-area-to-volume ratio and is commonly used in plastics, as reinforcement in tires, electronic packaging, printing inks and ultraviolet (UV) stabilization. The structure of CB makes it useful for imparting superoleophobicity because of its ability to agglomerate nanometer-sized primary carbon particles (nodules) into larger multi-scale, grape-like structures up to 1000 microns in size. Another important feature of CB is the presence of 6-8% hydroxyl (OH) functionality on the surface of the agglomerates. These OH groups are useful for bonding perfluorosilanes to the composite CB surfaces in order to lower the surface energy and produce superoleophobicity, as well as improve the cohesion of the coating. Conductivity can be enhanced by additional graphitization of carbon black.

The size of the CB nanoparticles influences the formation of re-entrant morphologies and subsequent superoleophobicity of the coating. In one embodiment, the nanoparticles have an average size of less than 2000 nm along each dimension. Preferably, the longest dimension has an average size of less than about 1000 nm, or less than about 500 nm or less than about 100 nm, or less than about 90 nm. The type of nanoparticles may be an important factor in selecting an appropriate average size. For example, conductive carbon black and other low aspect ratio (less than about 20:1) nanoparticles should have an average particle size of less than about 500 nm, preferably less than about 300 nm, while carbon nanotubes having a high aspect ratio (about 20:1 or greater) preferably have an average length from about 1000 nm to about 2000 nm. The nanoparticles preferably have an average particle diameter in a range of about 1-75 nm, preferably about 10-60 nm or about 10-50 nm, for example about 10-30 nm or about 40-60 nm. The aspect ratio of the nanoparticles is preferably less than about 50:1, more preferably less than about 40:1, or less than about 30:1, or less than about 20:1. The nanoparticles in the coating provide a multi-scale roughness ranging from nanometers up to micrometers, the roughness comprising nanometer-sized particles fused together to produce larger aggregated particles embedded in the elastomer. Thus, micron-sized aggregates about 50-500 μm in size possess re-entrant or overhanging morphology; while at a smaller scale nano-sized aggregates about 100-200 nm in size also possess re-entrant or overhanging morphology. This multi-scale roughness is desirable for superoleophobicity.

The relative amounts of elastomer and nanoparticles in the coating are selected to achieve a combination of superoleophobicity and conductivity. The coating comprises at least 30 wt % nanoparticles based on combined weight of elastomer and nanoparticles. The amount of nanoparticles is generally adjusted so that surfaces of nanoparticle aggregates are not completely covered by elastomer; some part of the aggregates protrude from the elastomeric matrix, thereby exposing the re-entrant morphology of the aggregates and providing the desired roughness to the surface of the coating. In one embodiment, the coating comprises at least 50 wt % nanoparticles, or at least 52 wt % nanoparticles, or at least 55 wt % nanoparticles, for example 55-75 wt % nanoparticles, or 55-66 wt % nanoparticles, or 55-60 wt % nanoparticles.

The coating may contain further auxiliary products for elastomers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known in the art. The auxiliary products may be used in conventional amounts that depend, inter alia, on the intended use. Conventional amounts are in the range of from 0.1 to 50 wt %, based on elastomer.

The coating is generally relatively thin in comparison to whatever substrate the coating may be supported on. Although the coating may be of any desired thickness, coating thicknesses in a range of about 5-200 μm or about 5-50 μm or about 100-200 μm are appropriate for many applications.

A material may be deemed superoleophobic if the contact angle for a liquid droplet on the surface of the material are equal to or exceed a value of 150°. Hexadecane is a common liquid used to measure contact angles. Thus, the coatings of the present invention preferably have a contact angle of greater than or equal to 150° with hexadecane. Further, sliding angle refers to the angle of minimum slope measured from the horizontal at which a droplet of liquid will begin to slide off the surface of the substrate. For substrates coated with a coating of the present invention, the sliding angle with reference to a droplet of hexadecane is preferably less than about 10°. In addition to being superoleophobic, coatings of the present invention also are superhydrophobic.

Coatings of the present invention retain their superoleophobicity and conductivity even under significant strain. Thus, a contact angle of greater than or equal to 150° may be maintained even when the coating is uniaxially stretched with strain up to about 400%, or up to about 300% or up to about 200% or up to about 100%. An electrical resistivity of less than about 0.1 Ohm·m, or less than about 0.015 Ohm·m, or less than about 0.01 Ohm·m may be maintained even when the coating is uniaxially stretched with strain up to about 100%.

It is an advantage of the present invention that a simple spray process may be used to form the coating on a substrate. The spray process involves dispersing (suspending or dissolving) the elastomer and nanoparticles in a solvent and blending them together. Auxiliary products for elastomers may be blended into the dispersion at any suitable stage. The dispersion is then sprayed on to a substrate. After the solvent evaporates, the resultant coating comprises a film of nanoparticle filler in an elastomeric matrix. The elastomeric matrix acts as a binder for the nanoparticles.

Solvents useful for dispersing solids (elastomer plus nanoparticles) include common organic solvents, for example hexanes, chloroform, tetrahydrofuran and mixtures thereof. Aids for dispersing solids in the solvent and/or blending dispersions of elastomer and nanoparticles may be used, for example mechanical mixing, ultrasonication, etc. Dispersing the solids in the solvent may be done for as long as required to achieve homogeneous dispersion. Typically from 1-4 hours may be required, although the time may be less or more in certain circumstances. Spray systems for spraying dispersions are known in the art and may be readily adapted to spray the dispersions of elastomer and nanoparticles.

While the total concentration of solids dispersed in the solvent can be generally within a wide range, the actual concentration may be important for the specific type of elastomer and/or nanoparticles being sprayed. Simple experimentation for a particular elastomer/nanoparticle combination would readily determine the concentrations that result in superoleophobic coatings. Concentration of solids in suspension in a range of 4-50 mg/mL may be useful for a wide variety of elastomer/nanoparticle combinations.

While the volume of dispersion being sprayed can be generally within a wide range, the actual volume may be important for the specific type of elastomer and/or nanoparticles being sprayed. Simple experimentation for a particular elastomer/nanoparticle combination would readily determine the volumes that result in superoleophobic coatings for a given surface area. Because volumes of dispersion being sprayed also depend on the surface area of the substrate to receive the coating, the scale of the spray operation also needs to be considered when determining the volume to be sprayed.

The sprayed elastomeric film may be cured or cross-linked if desired or required to provide further surface stability for the coating. Cross-linking and curing methods are well known in the art and depend on the particular elastomer used in the coating. Some examples of cross-linking or curing methods include ultraviolet (UV)-assisted cross-linking (with suitable initiator if necessary), hyperthermal hydrogen bombardment-induced cross-linking (HHIC), peroxide curing, sulfur curing and heating. It is particularly advantageous to use elastomers because the cross-linking or curing process lends greater surface stability to the final coating without unduly sacrificing superoleophobicity, conductivity or stretchability. After cross-linking or curing the coatings have better adhesion to substrates. A contact angle of greater than or equal to 150° may be maintained even after having tape applied and peeled off the cross-linked coating.

To impart superoleophobicity to the coating, it is desirable to lower the surface energy of the coating surface (in addition to having surface re-entrant morphology). An effective way to lower the surface energy is to include silylated or fluorinated moieties on the surface by chemical or physical methods. One way of introducing silylated or fluorinated moieties to the surface is to apply a silylated or fluorinated compound to the coating surface after the elastomer/nanoparticle blend has been sprayed. The silylated or fluorinated compound may be applied by any suitable method, for example vapor deposition (e.g. chemical vapor deposition) or dip coating. Some examples of suitable silylated or fluorinated compounds include perfluorosilanes, chlorosilanes, ethoxysilanes and methoxysilanes. Perfluorosilanes are preferred, especially perfluorinated silanes having from 7-10 carbon atoms (e.g. 1H,1H,2H,2H-perfluorodecyltrichlorosilane (PFTS)). In another method, fluorinated moieties may be introduced as part of the elastomer being blended with the conductive filler. Thus, fluorinated elastomers may successfully provide the desired fluorinated moieties without the need for an extra fluorination step. Preferably the fluorinated elastomer comprises a multiplicity of —$CF_3$ groups exposed to the surface in order to sufficiently lower surface energy.

Coatings of the present invention may be deposited on any desired substrate. Some examples of substrates include thermoplastic polymers (e.g. polyethylene terephthalate), elastomers (e.g. butyl rubber), silicon, metals (e.g. aluminum, gold, silver, copper and steel), glass, textiles and paper. The substrate preferably comprises a suitable functional group for cross-linking with the coating if such cross-linking is desired. A substrate with pre-existing roughness (e.g. fabrics or meshes) is also advantageous for some applications.

The present invention provides a simple, scalable and industry-applicable coating technology for making multi-functional surfaces that are both conductive and superoleophobic. The coatings are useful in a variety of industries including, for example, the electronics, building & construction, aerospace, automotive and clothing industries. The coatings are useful in a variety of general applications including, for example, anticorrosion, anti-icing, de-icing, oil repellency, anti-oil creep, self-cleaning, heat transfer and drag reduction. Some specific applications include, for example, electromagnetic interface shielding, electrostatic discharge, electrostatic painting, OLED (organic light-emitting diode), sensors, actuators, organic or hybrid solar cells, displays, screens, seals, gaskets, hoses, clothing (e.g. military or industrial clothing). The coatings are particularly advantageous in any application where superoleophobic and/or conducting properties need to be maintained under stretching of the surface.

Materials

Polyisoprene (PIP), hexanes, chloroform, tetrahydrofuran (THF), hexadecane and 2,2-azobisisobutyronitrile (AIBN) were obtained from Sigma-Aldrich. 1H,1H,2H,2H-Perfluorodecyltrichlorosilane (PFTS) was obtained from Alfa Aesar. Conductive carbon black (CB, Vulcan XC 72™), was purchased from Cabot Corporation. All of the chemicals were used in the as-received condition without further modification. Polyisoprene pellets (Multiwalled carbon nanotubes (MWCNT), 40-60 nm diameter, 1-2 μm length, were purchased commercially from Nanostructured & Amorphous Materials, Inc. (Houston, USA). Peroxide cured butyl rubber substrates were prepared in-house using conventional techniques. BB2030™ was obtained from LANXESS Deutschland GmbH and peroxide cured as described above. The peroxide curing agent used was dicumyl peroxide. Polydimethylsiloxane (PDMS) Sylgard™ 184 elastomer kit containing the prepolymer base and curing agent was obtained from Dow Corning Co.

Methods:

Sessile droplet contact angles were measured in ambient air at room temperature using a contact angle goniometer (Model 100-00). Two low surface energy liquids were used for contact angle measurements: (1) hexadecane; and, (2) methanol. For testing under uniaxial stretching, the coatings were sprayed on flexible butyl rubber substrates following cross-linking and fluorination processes. The substrates were then mounted between two linear clamps and stretched to a maximum of 100% strain.

The surface morphology of the coatings was assessed using a Hitachi S-4500 scanning electron microscope (SEM). The samples were sputter-coated with a thin layer of platinum prior to examination in order minimize sample charging. Cross-sections of the samples were also prepared by freeze fracturing. The samples were immersed in liquid nitrogen for 5 minutes and then fractured by bending. The fractured surfaces were then examined by SEM.

EXAMPLES

Example 1-7: To investigate the effect of concentration on the surface morphology, four different solutions were used with various ratios of PIP to CB. (50:50 wt %, 45:55 wt %, 40:60 wt % and 34:66 wt %).

TABLE 1

| | Composition wt % | | | |
|---|---|---|---|---|
| | PIP | CB | AIBN | Hexanes |
| Example 1 | 0.93 | 0.93 | 0.04 | 98.1 |
| Example 2 | 0.84 | 1.02 | 0.04 | 98.1 |
| Example 3 | 0.75 | 1.11 | 0.04 | 98.1 |

TABLE 1-continued

| | Composition wt % | | | |
|---|---|---|---|---|
| | PIP | CB | AIBN | Hexanes |
| Example 4 | 0.63 | 1.24 | 0.03 | 98.1 |
| Example 5 | 0.75 | 1.11 | — | 98.1 |
| Example 6 | 0.93 | 0.93 | — | 98.1 |
| Example 7 | 0.63 | 1.24 | — | 98.1 |

Example 3 was prepared by dissolving 250 mg of PIP in 25 mL hexane and ultrasonicated at room temperature for 1 h to obtain an 2 wt % solution. In a separate vial, 416 mg conductive CB was dispersed in 25 mL of hexanes and ultrasonicated for 1 h to yield a 2 wt % suspension. The PIP solution and the CB suspension were blended together and further sonicated for at least 4 h. The UV initiator (AIBN) was dissolved in 200 μL THF and added to the suspension before spraying at a concentration of 2% of molar ratio of polymer. The blends were sprayed on butyl rubber substrates using an airbrush (Badger, Model 350-1H) connected to a compressed nitrogen tank. The air dried coatings were exposed to ultraviolet light (365 nm) for 20 minutes with the resulting cross-linked samples placed in a glass bottle in order to deposit PFTS on them via chemical vapor deposition (CVD). A total of 20 μL of PFTS was dropped in the glass bottle, sealed and then placed for 30 min in an oven at 75° C.

Similar procedures were followed for the other samples, with adjustment of the relative amounts of PIP, CB and other reagents as appropriate to achieve the final proportions.

To compare methods of cross-linking, selected samples were also cross-linked using hyperthermal hydrogen bombardment-induced cross-linking (HHIC) instead of UV curing of the polymer. Solutions of PIP and CB were sprayed on butyl rubber using the same technique as outlined above. To cure the sprayed on coatings, the following HHIC conditions were used: the pressure of the neutral $H_2$ gas was 0.8 mTorr; the incident ionic current was 10 mA; the accelerating voltage (Vacc) was −100 V; the retarding voltages (Vret) were +100 V and −50 V and the cross-linking exposure time was 120 s.

Figure 2:
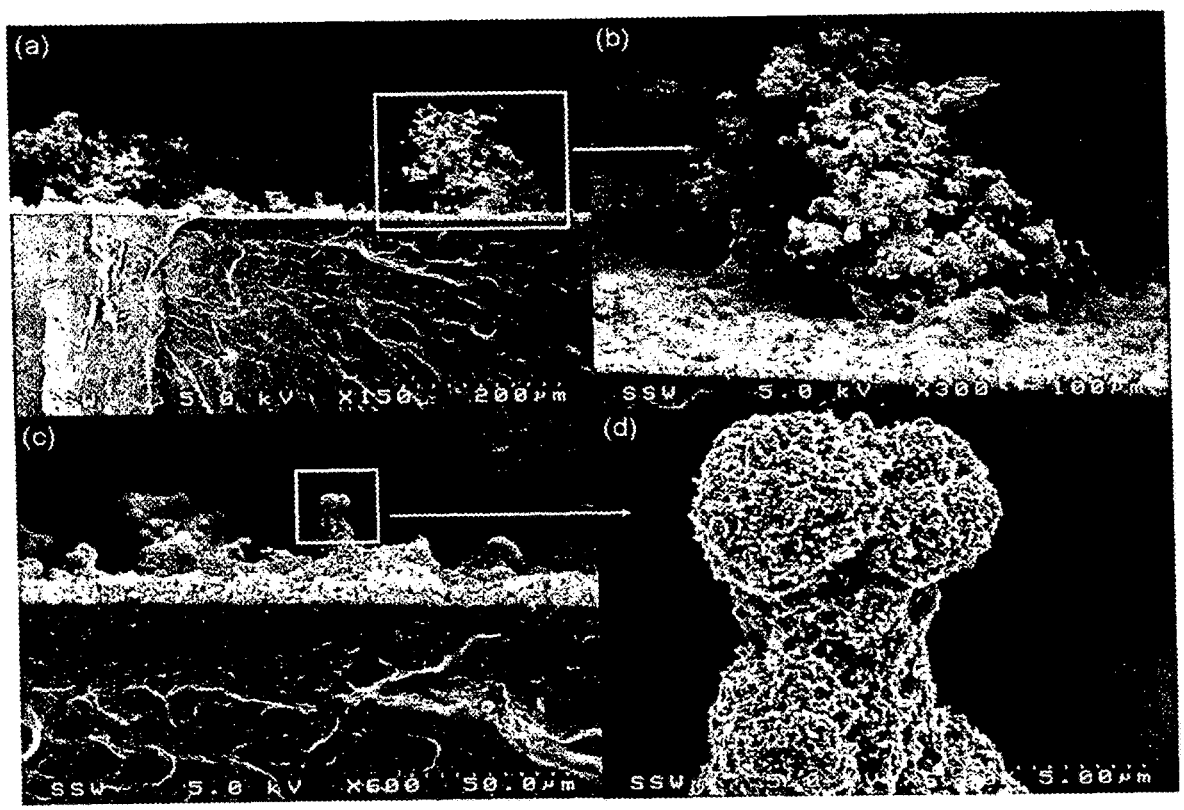
FIG. 2 depicts SEM images of cross-section samples of UV cross-linked superoleophobic coating (P45C55, denoting 45/55 wt % PIP/CB) at different magnification increasing from left to right, where the cross-section was produced by freeze-fracturing.

SEM images of UV cross-linked coatings (FIG. 1) show the morphology of the composite coatings sprayed on butyl rubber substrates at different magnifications, where multi-scale hierarchical structures are observed that is important to produce supeoleophobic surfaces. This is further demonstrated when Example 2 was cross-sectioned (FIG. 2), where the roughness ranges from several nanometers to hundreds of microns.

Table 2 shows static contact angle (CA) measurements of the composite coatings sprayed on butyl rubber as a function of carbon black concentration, with increasing CB concentration resulting in an increase in CA for both hexadecane and methanol up to 60% CB.

TABLE 2

| | Contact Angle (°) | | |
|---|---|---|---|
| | Methanol | Hexadecane | Hexadecane after tape test |
| Example 1 | 122 ± 6 | 142 ± 8 | — |
| Example 2 | 134 ± 2 | 153 ± 2 | — |
| Example 3 | 133 ± 4 | 158 ± 5 | 150 ± 5 |
| Example 4 | 134 ± 4 | 158 ± 5 | — |

TABLE 2-continued

| | Contact Angle (*) | | |
|---|---|---|---|
| | Methanol | Hexadecane | Hexadecane after tape test |
| Example 5 | — | 152 ± 2° | 143 ± 2 |
| Example 6 | — | 120 ± 7 | — |
| Example 7 | — | 150 ± 5 | |

The adhesion of the fluorinated PIP+CB coatings was investigated using a simple tape test on two samples, Example 3 (crosslinked) and Example 5 (not crosslinked). Nichiban tape, was pressed onto the surface of the coating and then pulled away with the results shown in Table 2. These results show that the coatings are durable and can maintain superoleophobicity after tape test.

Figure 3:
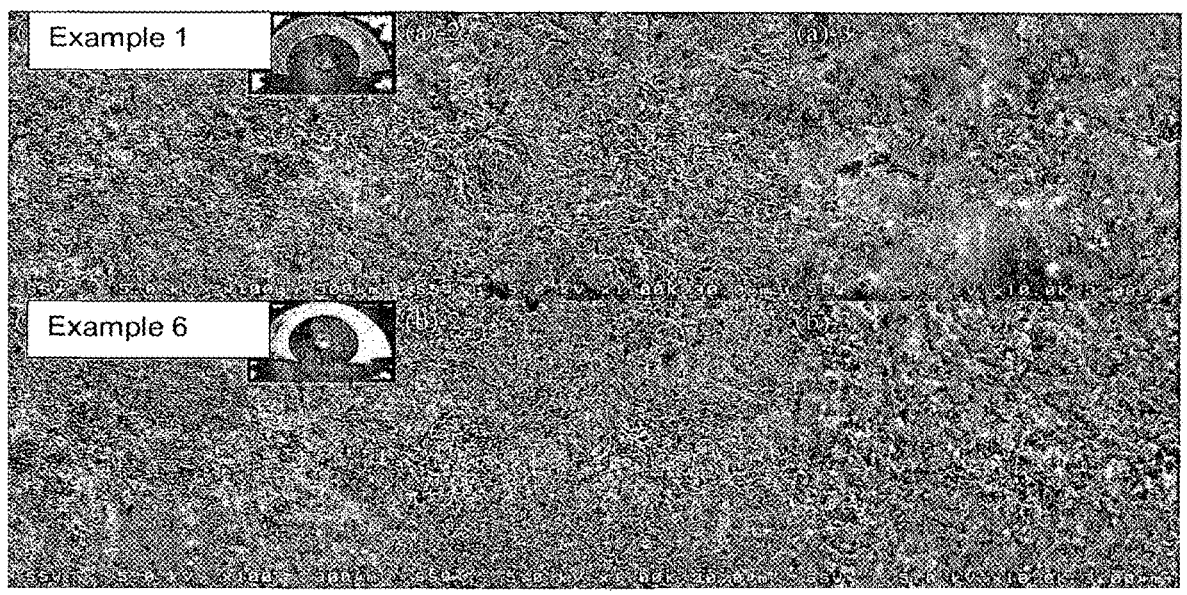
FIG. 3 depicts SEM images showing morphology of coatings (P50C50, 50/50 wt % PIP/CB blends, 12.5 mg/mL) via different cross-linking methods: (a) HHIC treatment for 2 minutes treatment; and, (b) UV cured 20 minutes.

Two different methods of cross-linking were investigated to determine how they affect surface morphology and contact angle. The SEM images presented in FIG. 3 compare a coating cross-linked using UV light (Example 1) and a coating cross-linked using HHIC for 2 minutes (Example 6). At higher magnification it can be seen that the Example 1 has a more porous structure compared Example 6 with the CA of hexadecane for the sample Example 6 being 120±7°, while the CA for Example 1 is 142±8°.

For the sample with higher carbon black content (Example 4 and 7) the difference in hexadecane contact angle between HHIC-cured (Example 7) and UV-cured (Example 4) samples is not so pronounced.

Figure 4:
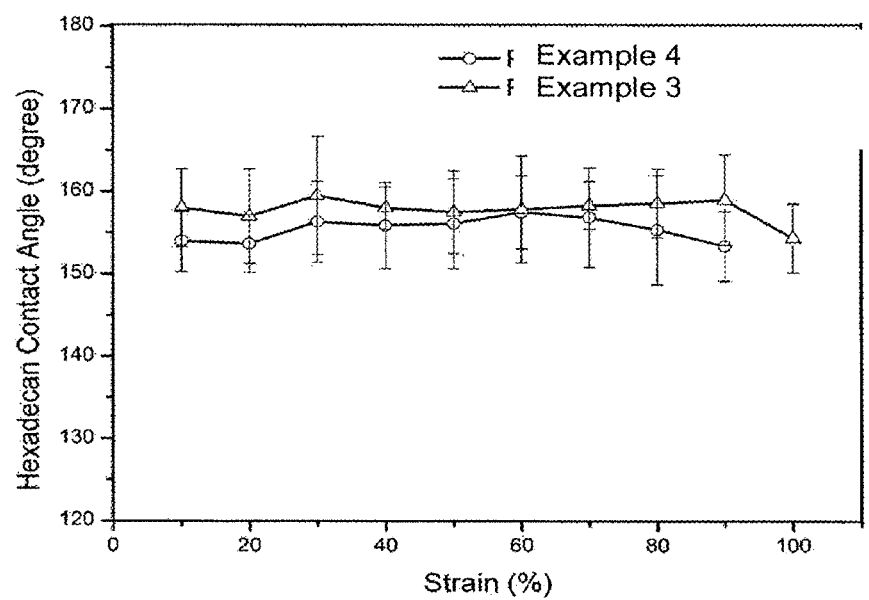
FIG. 4 depicts a graph showing hexadecane contact angles as a function of strain for coatings deposited on butyl rubber substrate, where the contact angle measurements were averaged for each data point.

FIG. 4 demonstrates that the robustness of the coating by measuring the the hexadecane contact angle for Examples 3 and 4 which remains superoleophobic up to 90% strain. Example 3 was elongated to 100% and still maintained superoleophobicity.

Figure 5:
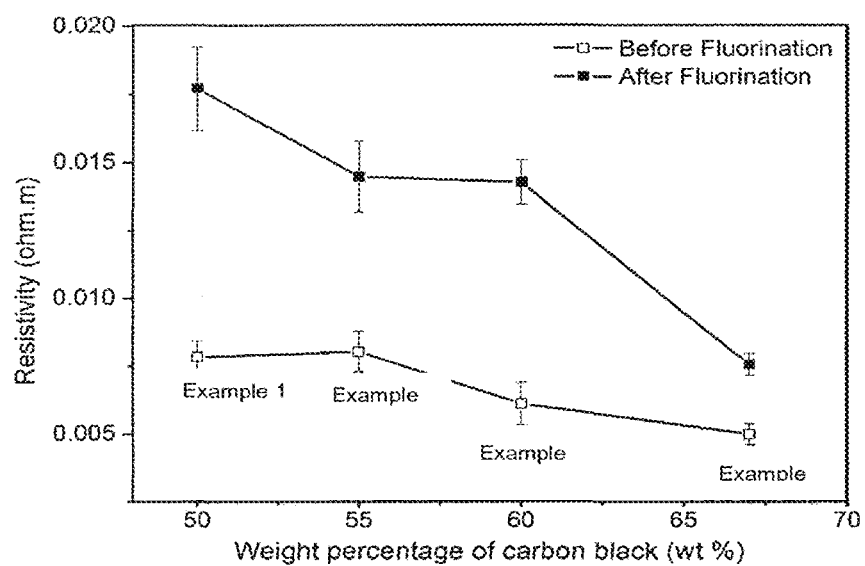
FIG. 5 depicts a graph of resistivity of composite coatings on butyl rubber substrates with different carbon black percentage (12.5 mg/mL)

The presence of conductive carbon black not only produces superoleophobic coatings, but it also provides a conductive network. FIG. 5 shows room-temperature resistivity of Examples 1-4 composite coatings on butyl rubber substrates as a function of carbon black concentration. The effect of resistivity before and after fluorination was also compared. The results show that, for all of the samples, the resistivity decreased as the CB content increased.

Figure 6:
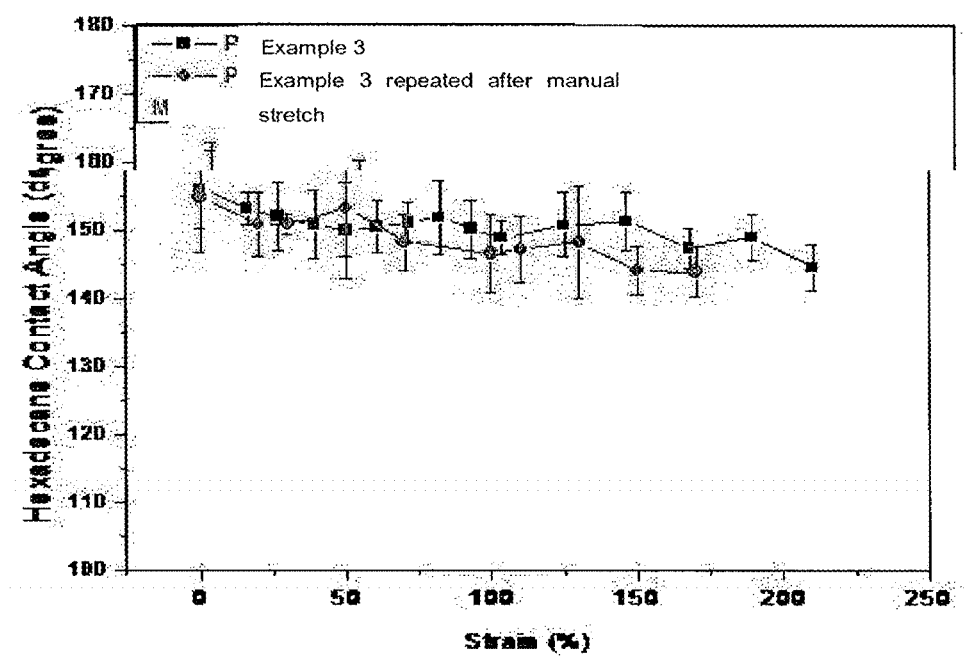
FIG. 6 depicts a graph showing contact angle versus strain for initial loading (black) and second loading after 48 hours (red) of a composite coating made with 60 wt % carbon black (12.5 mg/ml) on butyl rubber substrate (11YR072)
Figure 7:
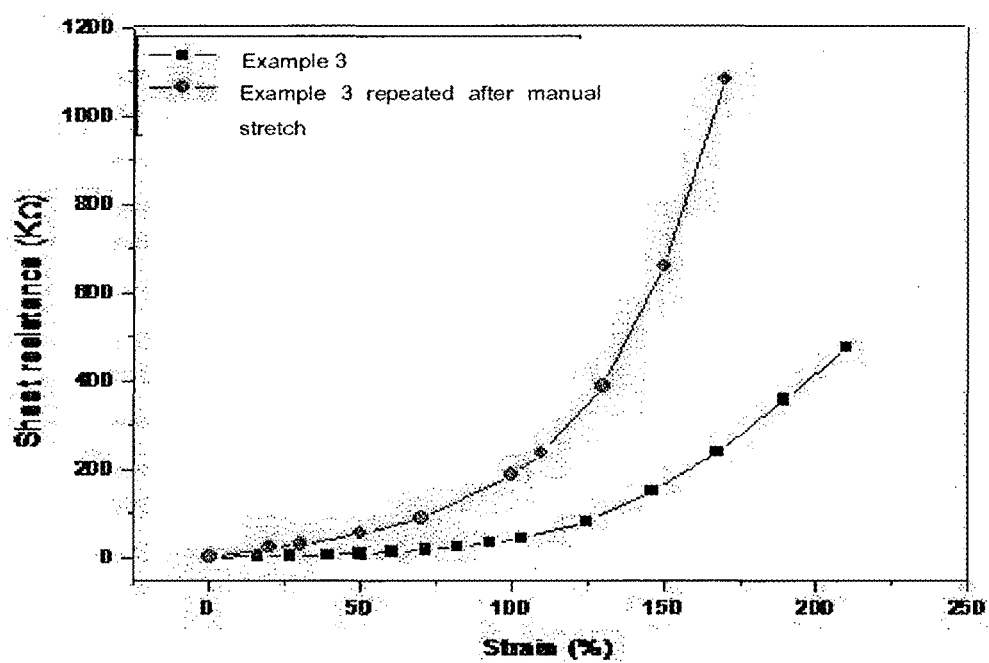
FIG. 7 depicts a graph showing sheet resistance versus strain for initial loading (black) and second loading after 48 hours (red) of a composite coating made with 60 wt % carbon black (12.5 mg/ml) on butyl rubber substrate (11YR072) (manual stretch)

To test the contact angle and sheet resistance of the dual-function nanocomposite surfaces under mechanical deformation, Example 3 was placed between two rigid clamps and extended. It was observed (FIG. 6a) that the contact angle decreased from 155° to 145° as the applied strain increased to 200% in the initial loading. The sample was then allowed to relax and a second loading applied. where the superoleophobicity of the sample remained. The initial sheet resistance for the specimen was 1.1 kΩ. During the first stretch, the resistivity (FIG. 7) showed a nonlinear and monotonic increase up to 100% strain and then increased rapidly to over 100 kΩ. After relaxation a second loading was applied to the same sample. The resistivity-strain curve showed a similar behavior as the initial resistivity-strain curve, but with a different slope. The increased slope reflects a decreased sensitivity of the composite coating to strain.

Examples 8-10: Example 8 was prepared dissolving 48 mg of MWCNT in 400 mL of chloroform and ultrasonicated at room temperature for 6 h to produce a well-dispersed MWCNT-chloroform dispersion. Next, 32 mg of PIP was added to the MWCNT dispersion and ultrasonicated for 5 h. The resulting PIP/MWCNT chloroform suspension was evaporated to get a higher concentration around 5 mg/mL. The UV initiator (AIBN) was dissolved in 200 μL THF and added to the suspension before spraying. The blends were sprayed on butyl rubber substrates using an airbrush as described above. Examples 9 and 10 were prepared in the same manner with varying PIP and MWCNT concentrations. All the samples showed superoleophobicity with hexadecane contact angles over 150° (Table 3).

TABLE 3

| | Composition wt % | | Contact | |
|---|---|---|---|---|
| | PIP | MWCNT | Angle (°) | Resistivity |
| Example 8 | 40 | 60 | 156 ± 3° | 3.2 kΩ |
| Example 9 | 45 | 55 | 153 ± 2° | |
| Example 10 | 50 | 50 | 165 ± 4° | |

Figure 8:
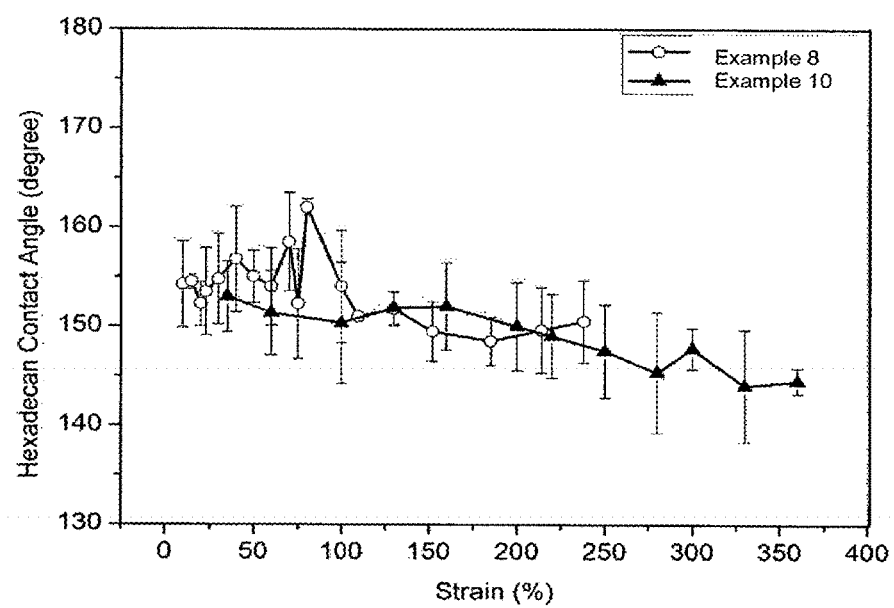
FIG. 8 depicts a graph showing hexadecane contact angles as a function of strain for two CNT concentrations (40/60 wt % PIP/CNT blends and 50/50 wt % PIP/CNT blends) deposited on butyl rubber substrates (11YR072), where the contact angle measurements were averaged for each data point.
Figure 9:
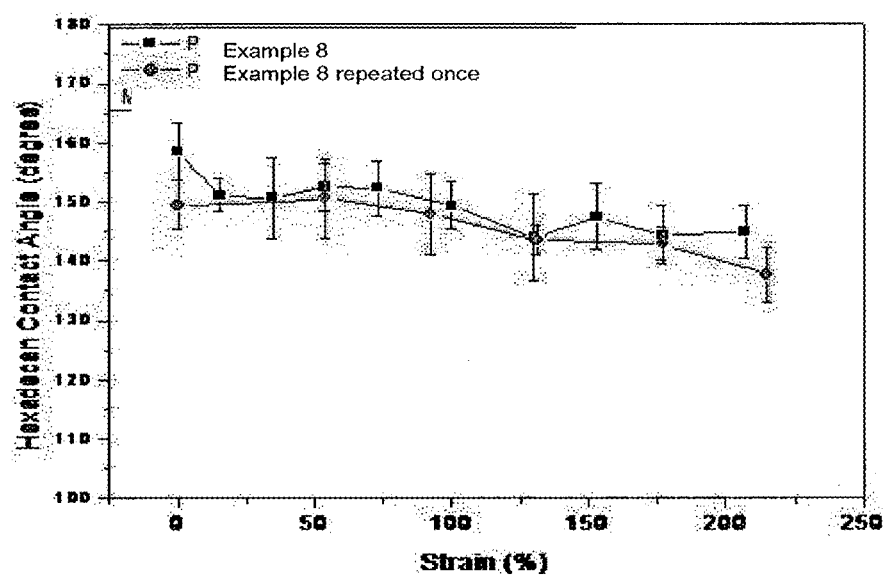
FIG. 9 depicts graphs showing contact angle versus strain for the initial loading (black) and second loading after 48 hours (red) of two composite coatings with 60 wt % CNT (5 mg/ml) on butyl rubber substrates (11YR072) (manual stretch)
Figure 10:
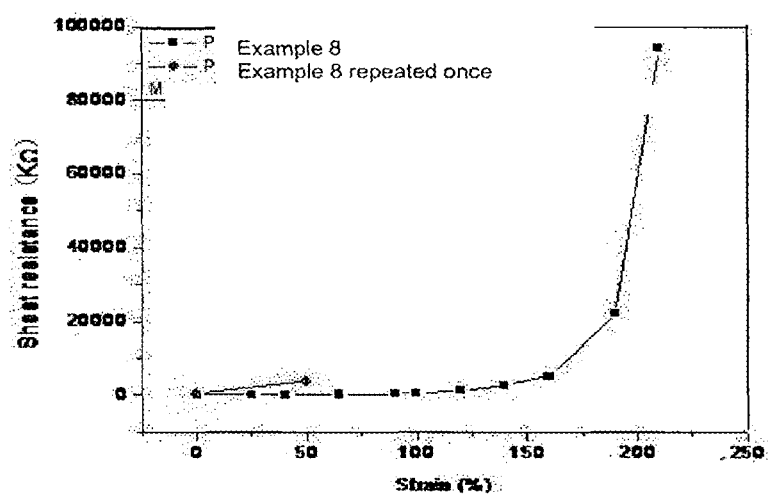
FIG. 10 depicts graphs showing sheet resistance versus strain for the initial loading (black) of two composite coatings with 60 wt % MWCNT percentage (5 mg/ml) on butyl rubber substrates (11YR072) (manual stretch), where the red line indicates a second stretch after 48 hours.

The CA for hexadecane measured as a function of strain for Example 8 and Example 10 is presented in FIG. 8. Both samples remained superoleophobic up to 250% strain, with Example 10 remaining superoleophobic up to 350% strain. FIG. 9 shows the repeatability of these systems with Example 8 stretched to 210%, allowed to relax and then stretch a second time, where the sample remained superoleophobic. The resistance of Example 8 was 3.2 kΩ and remained flat up to 150% elongation. After allowing the sample to relax, the resistance was measured again and showed good maintenance of resistivity (FIG. 10).

Example 11: A PDMS coating containing 34% PDMS and 66% CB was prepared similar to Example 3 but omitted the use of AIBN and using a higher concentration of 40 mg/mL. The resulting surface was superoleophobic with a contact angle of 152±3°.

Example 12-16: PDMS/MWCNT were prepared similar to Example 9 but omitted the use of AIBN. Examples 15 and 16 demonstrated superoleophobicity.

TABLE 4

| | Composition wt % | | Contact |
|---|---|---|---|
| | PDMS | MWCNT | Angle (°) |
| Example 12 | 80 | 20 | 92 ± 3° |
| Example 13 | 60 | 40 | 112 ± 2° |
| Example 14 | 50 | 50 | 138 ± 2° |
| Example 15 | 34 | 66 | 150 ± 2° |
| Example 16 | 25 | 75 | 153 ± 2° |

Examples 17-18: LANXESS BB2030 was prepared similar to Example 3 with the exception of requiring a higher concentration of 30-40 mg/mL. Both surfaces were superoleophobic with contact angles of >150°.

TABLE 5

| | Composition wt % | | Contact |
|---|---|---|---|
| | BB2030 | CB | Angle (°) |
| Example 17 | 66 | 34 | 154 ± 5° |
| Example 18 | 50 | 50 | 154 ± 5° |

Figure 11:
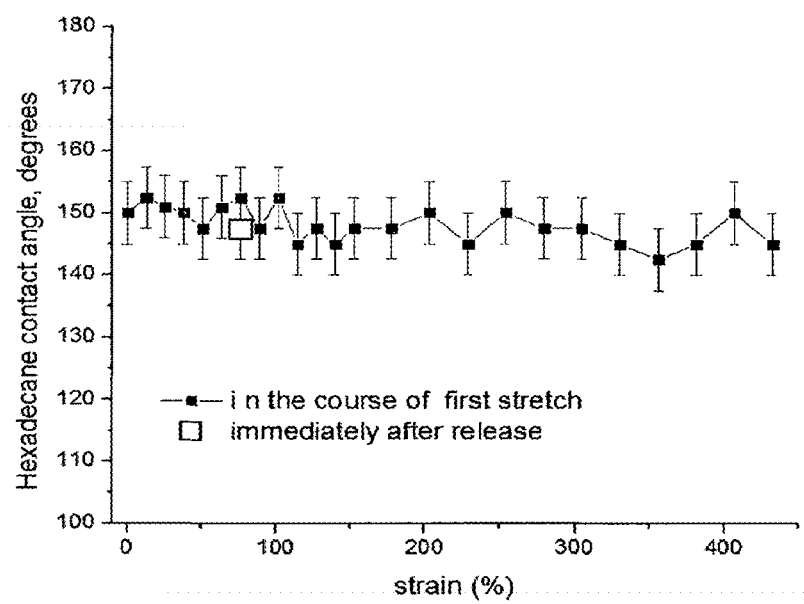
FIG. 11 depicts a graph showing hexadecane contact angle as a function of strain for a cured IIR (BB2030) with CB (66%) (sprayed at 30 mg/ml), where the contact angle immediately upon the sample release (when it returned to about 25% strain) is shown with an open square.
Figure 12:
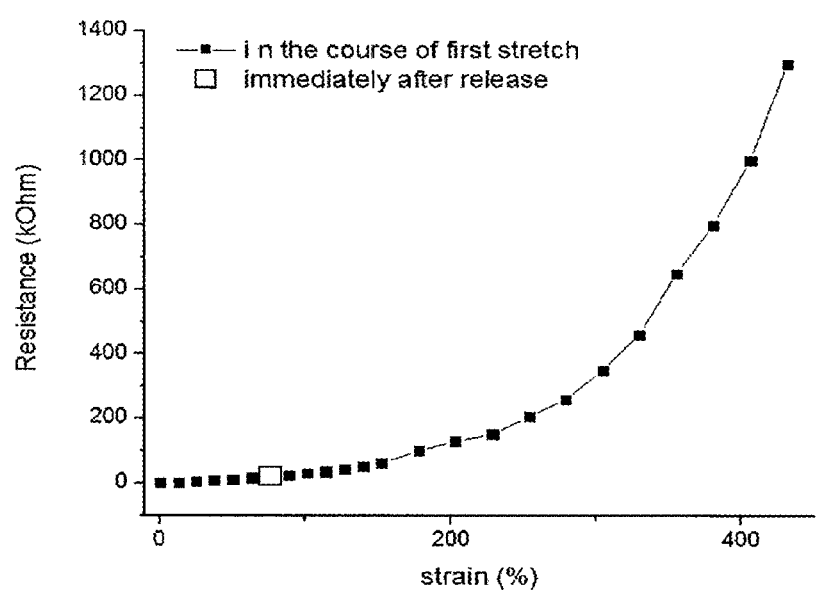
FIG. 12 depicts a graph showing sample resistance as a function of strain for IIR (BB2030) with CB (66%) (sprayed at 30 mg/ml), where the resistance immediately upon the sample release (when it returned to about 25% strain) is shown with an open square.

The superoleophobicity Example 17 was studied as a function of strain with the hexadecane contact angle as a function of strain presented in FIG. 11. The samples maintained a high contact angle of approximately 150° up to a maximum strain of 450%. The sheet resistance of the Example 17 was measured as a function of strain (FIG. 12). The initial sheet resistance before stretching was about 1 kΩ. The sample was then stretched to over 400% where the sheet resistance increased linearly up to approximately 150% strain. After 150% strain, the sheet resistance increased quickly to over 1 MΩ.

Example 19-22: PIP/CB coatings were prepared similar to Example 3 but were sprayed on various surfaces as opposed to a butyl sheet. All surfaces were superoleophobic.

TABLE 6

| | Composition wt % | | | Contact |
| --- | --- | --- | --- | --- |
| | PIP | CB | Substrate | Angle (°) |
| Example 19 | 40 | 60 | Aluminum | 150 ± 3° |
| Example 20 | 40 | 60 | Glass | 148 ± 4° |
| Example 21 | 40 | 60 | PET | 154 ± 4° |
| Example 22 | 40 | 60 | Paper | 156 ± 4° |

Example 23-25: LANXESS BB2030/CB coatings were prepared similar to Example 17 but were sprayed on various surfaces as opposed to a butyl sheet. All surfaces were superoleophobic.

TABLE 7

| | Composition wt % | | | Contact |
| --- | --- | --- | --- | --- |
| | BB2030 | CB | Substrate | Angle (°) |
| Example 23 | 34 | 66 | Gold | 151 ± 5° |
| Example 24 | 34 | 66 | Aluminum | 150 ± 5° |
| Example 25 | 34 | 66 | Silicon | 154 ± 5° |

Example 26: All the superoleophobic surfaces described above had a final surface treatment using 1H,1H,2H,2H-perfluorodecyltrichlorosilane (PFTS) as described in Example 1. As an alternative fluorination method, a PIP+CNT solution was prepared using a similar method described in Example 1. Next, the cross-linked coating was immersed into 0.5 wt % PFTS in hexanes solution, rinsed in hexanes to remove excess PFTS and dried in a fume hood. The surface was found to be superoleophobic with a hexadecane contact angle of 153±3°.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

The invention claimed is:

1. A polymer nanocomposite coating comprising an elastomeric film
    containing an elastomer and at least 30 wt % conductive nanoparticles based on the combined weight of the elastomer and the conductive nanoparticles, wherein:
        for the conductive nanoparticles having an aspect ratio of less than 20:1, the conductive nanoparticles have an average particle size along each dimension of less than 500 nm,
        for the conductive nanoparticles having an aspect ratio of 20:1 or greater, the conductive nanoparticles have an average particle size along each dimension of less than 2000 nm, and
        the conductive nanoparticles form micro- and nano-sized aggregates having re-entrant morphology.

2. The coating according to claim 1, wherein the conductive nanoparticles have an average particle size of 10 to 50 nm and/or an aspect ratio of less than 40:1.

3. The coating according to claim 1, wherein the conductive nanoparticles form nano-sized aggregates 100 to 200 nm in size and micro-sized aggregates 50 to 500 μm in size embedded in the elastomer.

4. The coating according to claim 1, wherein the conductive nanoparticles comprise carbon black, carbon nanotubes, or mixtures thereof.

5. The coating according to claim 1, wherein the elastomer comprises polyolefin-based elastomers, polydimethylsiloxanes, or mixtures thereof.

6. The coating according to claim 1, wherein the elastomer is cross-linked.

7. The coating according to claim 1, further comprising a fluorinated compound.

8. The coating according to claim 1, comprising an electrical resistivity of less than about 0.015 Ohm·m and a contact angle of greater than about 150° with hexadecane when the coating Is uniaxially stretched with strain up to about 100%.

9. A substrate comprising the coating as defined in claim 1 coated thereon.

10. The coating according to claim 1, wherein:
    the coating comprises at least 50 wt % of the conductive nanoparticles;
    for the conductive nanoparticles having an aspect ratio of less than 20:1, the conductive nanoparticles have an average particle size along each dimension of less than 300 nm, and
    for the conductive nanoparticles having an aspect ratio of 20:1 or greater, the conductive nanoparticles have an average particle size along each dimension of 1000 to 2000 nm, and
    the conductive nanoparticles have an average particle diameter of about 1.75 nm.

11. The coating according to claim 1, wherein:
    the conductive nanoparticles have an average particle diameter of about 10 to 50 nm; and
    the aspect ratio of the conductive nanoparticles is less than about 30:1.

12. The coating according to claim 1, wherein:
    the conductive nanoparticles have an average particle diameter of about 10 to 30 nm or about 40 to 60 nm; and
    the aspect ratio of the conductive nanoparticles is less than about 20:1.

13. The coating according to claim 1, wherein:
    the conductive nanoparticles comprise conductive carbon black;
    the conductive nanoparticles have a longest dimension with an average size of less than about 90 nm;
    the conductive nanoparticles form nano-sized aggregates 100 to 200 nm in size and micro-sized aggregates 50 to 500 μm in size embedded in the elastomer;
    the elastomer comprises polyisoprene, poly(isobutene-co-isoprene), ethylene-propylene monomer (EPM), ethylene propylene diene monomer (EPDM), hydrogenated nitrile butadiene, functionalized derivatives thereof, or mixtures thereof; and the coating further comprises a perfluorosilanes on a surface of the coating.

14. A process for producing a polymer nanocomposite coating, the process comprising spraying a blend of an elastomer and conductive nanoparticles onto a substrate to form a film on the substrate, wherein:
the blend comprises at least 40 wt % of the conductive nanoparticles based on the combined weight of the elastomer and the conductive nanoparticles,
for nanoparticles having an aspect ratio of less than 20:1, the conductive nanoparticles have an average particle size along each dimension of less than 500 nm,
for nanoparticles having an aspect ratio of 20:1 or greater, the conductive nanoparticles have an average particle size along each dimension of less than 2000 nm, and
the conductive nanoparticles form micro- and nano-sized aggregates on the substrate, the aggregates having re-entrant morphology, and
optionally curing or cross-linking the film.

15. The process according to claim 14, wherein the blend comprises a dispersion of the elastomer and nanoparticles in a solvent, with the elastomer and nanoparticles present in the dispersion at a combined solids concentration of 4 to 50 mg/ml.

16. The process according to claim 14, further comprising including fluorinated moieties on the surface of the film,
optionally wherein the fluorinated moieties includes a perfluorosilane and the method includes a step of applying the perfluorosilane to the film.

17. The process according to claim 14, wherein the elastomer comprises polyisoprene, poly(isobutene-co-isoprene), poly(isobutene-co-isoprene) functionalized with one or more of an anhydride group, a carboxyl group, a hydroxyl group, an epoxy group, a polyethylene oxide group or a halo group, or mixtures thereof.

18. The process according to claim 14, wherein the nanoparticles comprise carbon black of carbon nanotubes having an average particle size of 10 to 50 nm and an aspect ratio of less than 40:1.

19. The process according to claim 14, wherein the blend comprises at least 50 wt % nanoparticles, based on the combined weight of the elastomer and the nanoparticles.

20. A polymer nanocomposite coating comprising an elastomeric film
containing an elastomer and at least 30 wt % conductive nanoparticles based on the combined weight of the elastomer and the conductive nanoparticles, wherein:
for the conductive nanoparticles having an aspect ratio of less than 20:1, the conductive nanoparticles have an average particle size along each dimension of less than 500 nm;
for the conductive nanoparticles having an aspect ratio of 20:1 or greater, the conductive nanoparticles have an average particle size along each dimension of less than 2000 nm;
the conductive nanoparticles form micro- and nano-sized aggregates; and
the coating further comprises a perfluorosilane on a surface of the coating.

* * * * *

UNITED STATES PATENT AND TRADEMARK OFFICE
CERTIFICATE OF CORRECTION

PATENT NO. : 11,390,761 B2
APPLICATION NO. : 17/031431
DATED : July 19, 2022
INVENTOR(S) : Lorenzo Ferrari et al.

It is certified that error appears in the above-identified patent and that said Letters Patent is hereby corrected as shown below:

In the Claims

Column 16, Line 27, In Claim 8, delete "coating Is" and insert --coating is--

Signed and Sealed this
Twenty-first Day of March, 2023

Katherine Kelly Vidal
*Director of the United States Patent and Trademark Office*